(12) United States Patent
Aue

(10) Patent No.: US 8,065,464 B2
(45) Date of Patent: Nov. 22, 2011

(54) METHOD FOR TRANSMITTING DATA FROM AND TO A CONTROL DEVICE

(75) Inventor: Axel Aue, Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/977,447

(22) Filed: Dec. 23, 2010

(65) Prior Publication Data

US 2011/0093632 A1 Apr. 21, 2011

Related U.S. Application Data

(63) Continuation of application No. 12/226,703, filed as application No. PCT/EP2007/053846 on Apr. 19, 2007, now Pat. No. 7,882,298.

(30) Foreign Application Priority Data

Apr. 26, 2006 (DE) .......................... 10 2006 019 305

(51) Int. Cl.
*G06F 13/00* (2006.01)
(52) U.S. Cl. ............. 710/316; 710/100; 701/102; 703/8
(58) Field of Classification Search .................. 710/100, 710/105, 316; 701/102; 703/8
See application file for complete search history.

(56) References Cited

U.S. PATENT DOCUMENTS

| | | | |
|---|---|---|---|
| 6,697,756 B2 * | 2/2004 | Wettstein et al. ............. 702/122 |
| 7,506,536 B2 | 3/2009 | Cornwell et al. | |
| 7,882,298 B2 * | 2/2011 | Aue ............................... 710/316 |
| 2003/0100980 A1 | 5/2003 | Gruenewald et al. | |
| 2003/0229748 A1 | 12/2003 | Brewer et al. | |
| 2006/0178804 A1 | 8/2006 | Laichinger et al. | |
| 2007/0086482 A1 | 4/2007 | Pruzan et al. | |

FOREIGN PATENT DOCUMENTS

| EP | 0 619 548 | 10/1994 |
|---|---|---|
| WO | WO 03/046724 | 6/2003 |
| WO | WO 2004/068346 | 8/2004 |

* cited by examiner

*Primary Examiner* — Glenn A Auve
(74) *Attorney, Agent, or Firm* — Kenyon & Kenyon LLP

(57) ABSTRACT

A method for transmitting data from and to a control device, in particular an engine control device for a motor vehicle that has a first communication interface and a second communication interface, the method having the following steps: connecting the first communication interface to a development tool, and connecting the second communication interface to one or more function units during the development phase of the control device, transmitting data from the control device to the development tool via the first communication interface using a first communication protocol, transmitting data from the development tool to the control device via the first communication interface using the first communication protocol, breaking the connection between the first communication interface and the development tool, connecting the first communication interface to one or more additional 20 function units, and transmitting data between the control device and the other function unit or function units via the first communication interface using a second communication protocol.

17 Claims, 2 Drawing Sheets

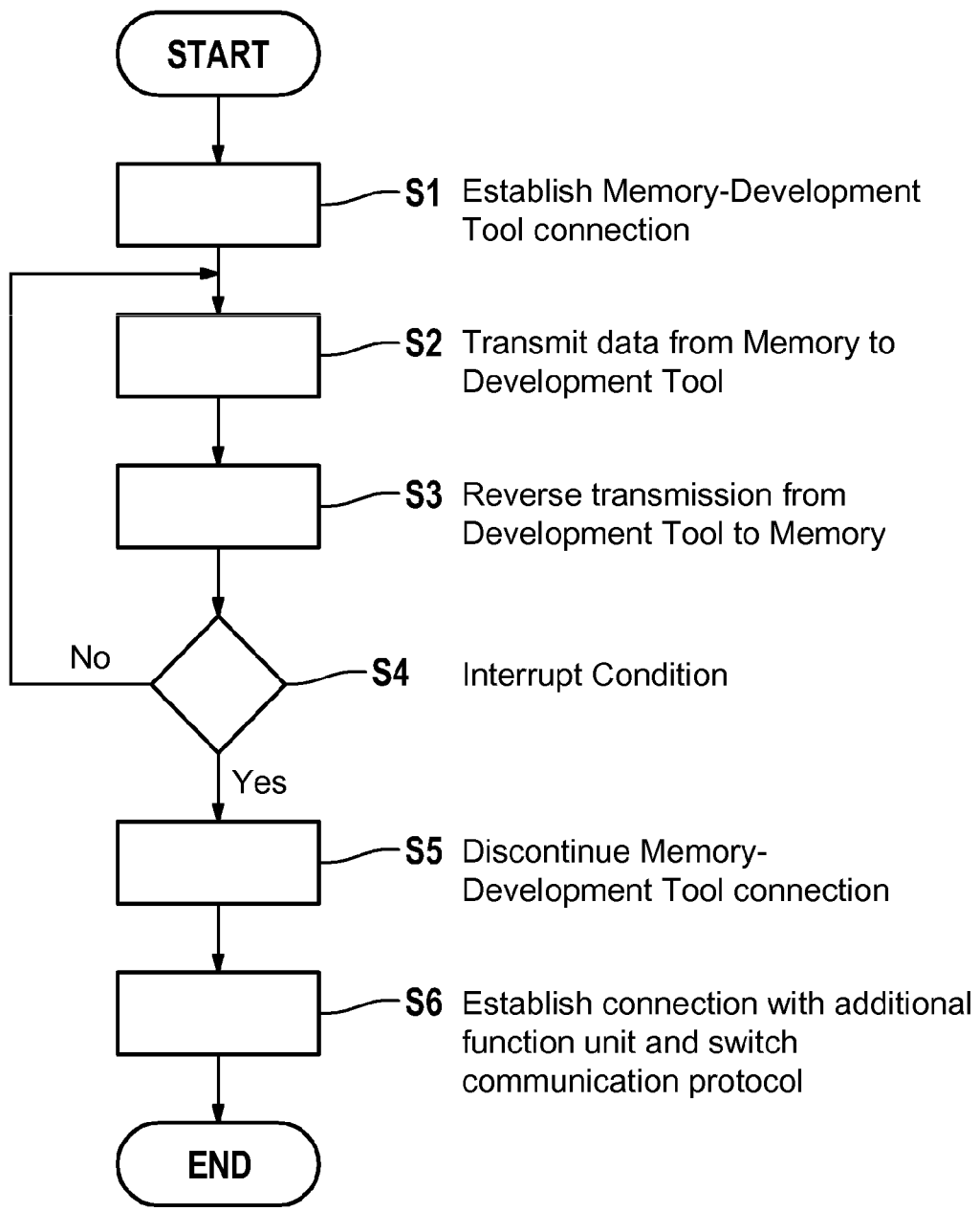

METHOD FOR TRANSMITTING DATA FROM AND TO A CONTROL DEVICE

CROSS-REFERENCES TO RELATED APPLICATIONS

The present application is a continuation of U.S. patent application Ser. No. 12/226,703 filed on Oct. 24, 2008, now U.S. Pat. No. 7,882,298 which was a national phase application based on international application PCT/EP2007/053846 filed on Apr. 19, 2007 and claimed priority to German Application DE 10 2006 019 305.9 filed on Apr. 26, 2006.

FIELD OF THE INVENTION

The present invention relates to the transmission of data between a control device, in particular an engine control device for a motor vehicle, and a development tool during the development phase of the control device.

BACKGROUND INFORMATION

Engine control devices control the functions of a motor vehicle, such as fuel injection, moment of ignition, vehicle immobilizer, and so on. The engine control device has a microcontroller that executes a predetermined program, and a memory in which particular vehicle parameters used in this program or the like are stored, for example. The control device controls function units (e.g., the metering system for the fuel injection of an engine), which are connected to the control device via a data bus, for example.

During the development phase of a control device, the control device is connected to an external development tool in addition to the function units of the vehicle (or to emulators that act as these function units vis-à-vis the control device). This development tool enables the developer to monitor and influence in detail the processing of the control program by the processor. To this end, the developer examines and modifies the vehicle parameters stored in the memory to analyze the behavior of the system controlled by the control device, for example. Thus, during the development phase, significantly larger quantities of data are exchanged with the control device than is the case when the completed control device is used later, so that a larger bandwidth is required for the data transmission.

Data may be transmitted between the control device and the development tool via the same data bus that is also used by the control device to communicate with the function units. For this purpose, the CAN interface (Controller Area Network) has established itself as an interface in the automotive sector. The associated CAN protocol is very flexible and makes it possible to add further nodes (e.g., function units or development tool) on the CAN bus without any problems. For communicating via the CAN bus, a priority-based bit arbitration takes place in which a unique priority is assigned to every message, this requiring a bidirectional transmission of data. Furthermore, the CAN protocol is fault-tolerant, which on the other hand calls for a significant protocol overhead, which leads to a restriction of the bandwidth available for data transmission.

Furthermore, the available bandwidth is already substantially exhausted by communication with the function units so that sufficient transmission capacity is no longer available for communication with the development tool. This may result in a delay in the transmission of data to the development tool, which falsely creates the impression of a malfunction of the control device. To be sure, it is possible to accelerate the transmission to the development tool by assigning it a sufficiently high priority on the bus. But, on the other hand, the result of this is that the requirements for the real-time response of the communication between control device and function units are not fulfilled reliably.

For providing a larger transmission capacity, DE 103 03 490 A1 proposes providing to the processor of the transmission device a second interface designed as a serial interface (e.g., USB or Fire-Wire interface) that is able to be used only for communication with the external development tool. During the development phase, large quantities of data may be exchanged via this interface without impairing the time response in communication via the first interface. However, providing the second interface leads to higher costs, so that ultimately such an engine control device is able to be used only as a prototype for the development phase for control devices; however, is not suitable for mass production.

SUMMARY OF THE INVENTION

Accordingly, a method is provided for transmitting data from and to a control device, in particular from and to an engine control device for a motor vehicle, having a first communication interface as well as a second communication interface, having the following steps:

connecting the first communication interface to a development tool and connecting the second communication interface to one or more function units during the development phase of the control device;

transmitting data from the control device to the development tool via the first communication interface using a first communication protocol;

transmitting data from the development tool to the control device via the first communication interface using the first communication protocol;

breaking the connection between the first communication interface and the development tool;

connecting the first communication interface to one or more additional function units; and transmitting data between the control device and the additional function unit or function units via the first communication interface, using a second communication protocol.

It should be noted that the function units connected to the second communication interface during the development phase may also be emulators, which simulate the functions (e.g., signal or measured value output) of vehicle components or the like.

A control device according to the present invention, in particular an engine control device for a motor vehicle, includes:

a communication interface that is able to be connected to a programming unit, a memory for storing data, a first communication unit, via which data are transmitted between the memory and the communication interface using a first communication protocol, a second communication unit, via which data are transmitted between the memory and the communication interface using a second communication protocol, a switching element that connects the communication interface optionally to the first communication unit or to the second communication unit, the control device being designed such that the switching element connects the communication interface to the first communication unit during the development phase of the control device and connects the communication interface to the second communication unit after the development phase of the control device.

The idea underlying the invention is to use an interface that is actually provided or designed for data transmission using a relatively slow transmission protocol to transmit data using a relatively fast transmission protocol during the development phase of the control device and thus to guarantee a faster transmission of data between the control device and the development tool. After completion of the development phase, this interface may then be used for data transmission with other function units.

The transmission of data from the control device to the development tool or from the development tool to the control device may be respectively performed as a unidirectional transmission, because in this way it is possible to ensure a higher rate of data transmission. In this context, a switch between the transmission of data from the control device to the development tool and the transmission of data from the development tool to the control device is performed may be at predetermined time intervals. In this context, the time period provided for the transmission of data from the control device to the development tool should be larger, since the transmission quantity arising in this direction is also significantly larger than the quantity for the other transmission direction.

Additionally, a step may be provided for switching a switching element that connects the first communication interface optionally to a first communication unit or to a second communication unit, the first communication unit controlling the transmission of data using the first communication protocol and the second communication unit controlling the transmission of data using the second communication protocol.

For example, the first communication protocol may be a unidirectional communication protocol, in particular, an asynchronous serial interface protocol, and the second communication protocol may be a bidirectional communication protocol, in particular, a CAN bus protocol. Thus, a communication interface designed as a CAN interface may be used as an asynchronous serial interface during the development phase of the control device, enabling significantly larger transmission rates: Because the differential CAN interface is used, the speed may be many times higher than that of a single-ended asynchronous serial interface.

The transmission of data from the development tool to the control device may include the storing of the data in a memory provided in the control device. In particular, the transmission of data between the development tool and the control device may include the measurement, adjustment, debugging, and/or bypassing of functions during the development phase of the control device.

In the following, the exemplary embodiments and/or exemplary methods of the present invention is explained in greater detail with the aid of the exemplary embodiments shown in the schematic figures of the drawings.

BRIEF DESCRIPTION OF THE DRAWINGS

FIG. 2 shows a flow diagram of a method according to one specific embodiment of the present invention.

DETAILED DESCRIPTION

Figure 1:
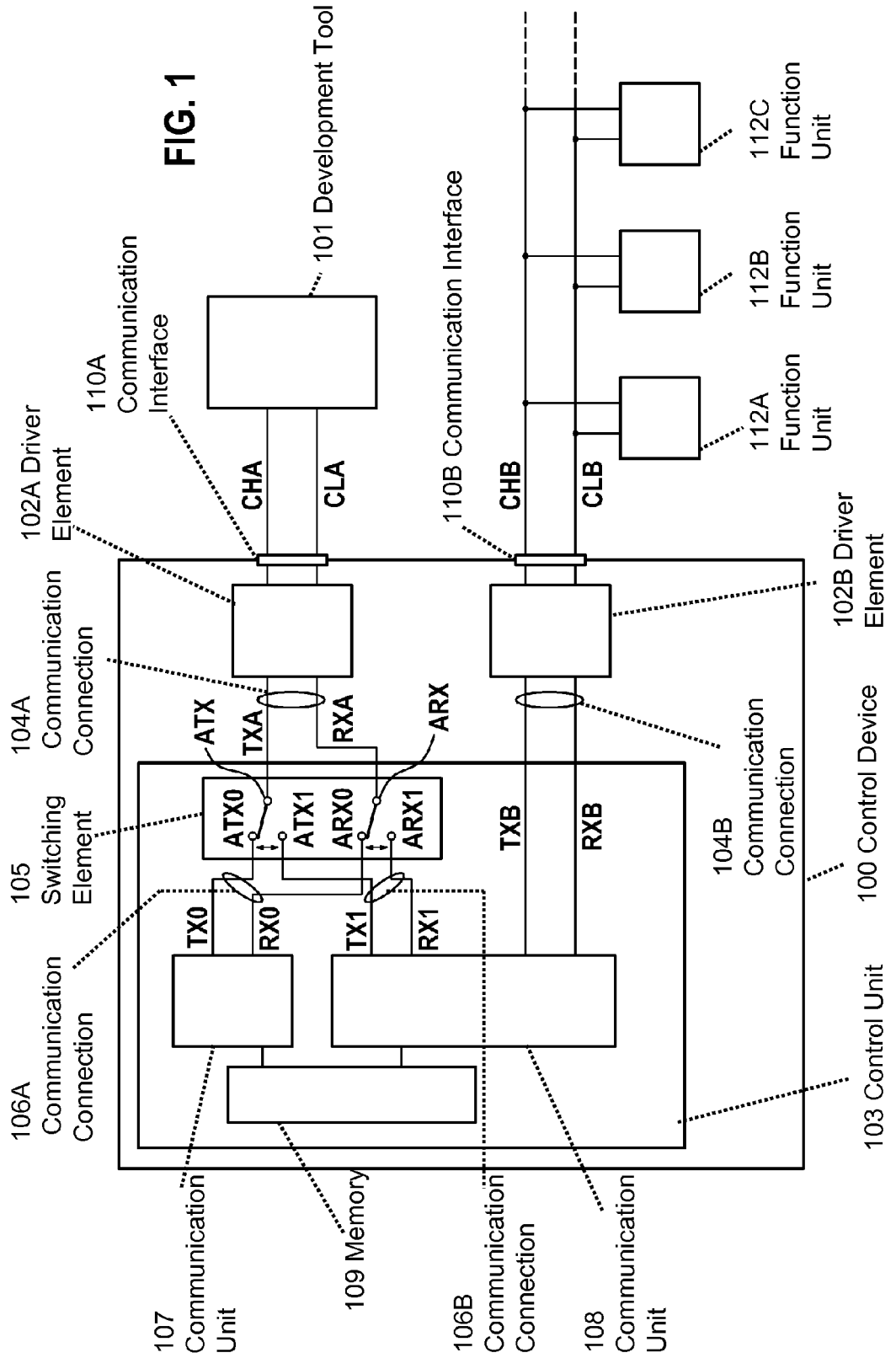
FIG. 1 shows a block diagram of a control device according to one specific embodiment of the present invention.

Unless specifically mentioned otherwise, identical or functionally equivalent elements have been provided with the same reference numerals in the figures of the drawings.

FIG. 1 shows a schematic diagram of a control device 100 according to one specific embodiment of the present invention. In the specific embodiment in question, control device 100 is designed as an engine control device, which controls the functions of a motor vehicle, such as fuel injection, moment of ignition, vehicle immobilizer, and so on.

In this specific embodiment, control device 100 has two communication interfaces 110A and 110B, to which communication connections 104A and 104B are respectively connected internally by lines TXA and RXA, and TXB and RXB, respectively. One driver element 102A and 102B is connected to these communication connections 104A and 104B respectively, which driver element may enable a bidirectional connection having the desired levels to communication interface 110A and 110B respectively. In the present specific embodiment, communication interfaces 110A and 110B are designed as CAN interfaces and driver elements 102A and 102B are designed as CAN drivers. The external lines are respectively labeled with CHA and CLA, and CHB and CLB, and thus correspond to CAN High and CAN Low.

During the development phase, control device 100 is connected via communication interface 110A to a development tool 101, as shown in FIG. 1, which in general is implemented on an external computer. Control device 100 is connected to function units 112A, 112B, 112C, and so on, via communication interface 110B. The metering system for the fuel injection of an engine is an example of such a function unit, and generally speaking the function units correspond to the sensors and actuators provided in the vehicle, which communicate with control device 100 via the CAN bus connected to interface 110B. During the development phase, emulators that simulate function units may also be connected to communication interface 110B instead of the function units.

A control unit 103, in particular, a microprocessor, microcomputer, or the like, is provided in control device 100. This control unit 103 contains a first communication unit 107, a second communication unit 108, a memory 109, and a switching element 105. Memory 109 may be a flash memory and is used to store a program executed by control unit 103 as well as vehicle parameters that are supplied to control device 100 by function units 112 via interface 110B. In this example, first communication unit 107 is designed as a serial interface module (e.g., asynchronous serial communication interface ASC) and is connected to memory 109. Data may be written to memory 109 or read from it via this first communication unit 107. In this example, second communication unit 108 is designed as a CAN controller and is likewise connected to memory 109 such that data may be written to memory 109 and read from it via this second communication unit 108.

Switching element 105 is provided in particular as a program-controlled interface change-over switch or also multiplexer and makes it possible to switch the communication connection from first communication unit 107 to second communication unit 108. In the specific embodiment shown in FIG. 1, switching element 105 is disposed within control unit 103; however, it may also alternatively be disposed outside of control unit 103.

First communication unit 107 is connected to switching element 105 via a communication connection 106a. For this purpose, lines TX0 and RX0 of communication connection 106a are connected to connections ATX0 and ARX0 of switching element 105. Likewise, second communication unit 108 is connected to switching element 105 via a communication connection 106b. For this purpose, lines TX1 and RX1 of communication connection 106b are connected to connections ATX1 and ARX1 of switching element 105.

Lines TXA and RXA of communication connection 104A connect switching element 105 to drive element 102A via connections ATX and ARX.

During the development process, the switch position of switching element 105, as shown in FIG. 1, is set to connections ATM and ARX0 so that first communication unit 107 is connected to development tool 101 via drive element 102A. In this state, data is transmitted between memory 109 and development tool 101 via a first bus protocol, which is an asynchronous serial interface protocol, like RS232, for example, in the present specific embodiment.

A significant advantage that results from this system is that the transmission of data between memory 109 and development tool 101 may be executed at a significantly higher transmission rate than is the case if the CAN bus protocol is used for this data transmission, as in traditional systems. Essentially, two factors are responsible for the higher transmission rate: First, in contrast to the CAN bus protocol, the asynchronous serial interface protocol is a unidirectional protocol, which allows a higher data throughput. Thus, in the event of unidirectional communication between memory 109 and a development tool 101 placed several meters away, a data transmission rate of 4 MBaud is possible, whereas with the CAN bus protocol only 500 kBaud or at most 1 MBaud are possible. Secondly, the CAN bus protocol has a significantly lower payload data rate, which lies at only 45% in contrast to 70% in the ASC protocol, due to its higher complexity and its higher overhead (e.g., due to the priority-based bus arbitration). This results in the estimate that the system of the present specific embodiment allows 4 MBaud*70%/500 kBaud*45%=12.44 times more data to be transmitted than the traditional exchange of data via the CAN bus protocol. Even compared to the CAN protocol with a transmission rate of 1 MBaud, the effective transmission rate of the present specific embodiment is still more than six times higher.

An additional advantage of this arrangement is that after the development phase is complete, first interface 110A is able to be used as an additional CAN interface and does not (as in DE 103 03 490A1) remain unused after the development phase is complete. Thus, a more efficient use of the hardware provided in control device 100 and an increase in the bandwidth for data transmission via the CAN protocol is achieved. An additional advantage is that in control device 100 no additional hardware is required in the application phase, so the control device corresponds to the standard control device, which is an advantage in terms of costs and tests (since there are no differences from the standard control device).

During the development phase, the transmission of data between memory 109 and development tool 101 thus takes place via an asynchronous serial bus protocol; however, not via a driver for a serial ASC interface, but rather via a fast driver for a standard CAN interface. To enable this, processor 103 connects internally the lines of its serial ASC interface (first communication unit 107) to the lines of a CAN interface 110A (switch position ATX0/ARX0). After completion of the development phase, switching element 105 is switched from switch position ATX0/ARX0 to switch position ATX1/ARX1, whereby second communication unit 108 (to wit, the CAN controller) is connected to first communication interface 110A via switching element 105.

During the development phase of control device 100, development tool 101 may be used for different applications in which data are exchanged between memory 109 and development tool 101, e.g.:

- Debugging: Monitoring and influencing the program located in control device 100 and possibly modifying commands of this program;
- Measuring: Transmitting the contents of individual cells of memory 109 to development tool 101 at a rate that corresponds to the rate of their actualization by control unit 103, and indicating via development tool 101 the physical value corresponding to the content of the cells;
- Adjusting: Modifying the parameters used by control device 100 in order to examine the effects of the modifications on the response of the engine controlled by control device 100;
- Bypassing of functions: Since the computing time and the resources in control device 100 are limited, changes in the programming of control device 100 may change its time response. To be able to develop functions without taking into account initially the limited capacity of control device 100, the calculation of values of a function in control device 100 is able to be deactivated, and the input values of the function are transmitted to the development tool. The development tool calculates the function and subsequently transmits the function results back to control device 100.

These different applications require various transmission directions between control device 100 and development tool 101. Thus, during the measurement process, data transmission occurs only (with the exception of the relatively rare transmission of addresses whose values (the measurement values) are to be transmitted) from control device 100 to development tool 101, whereas during the adjustment, data are transmitted only from development tool 101 to control device 100. During the debugging and bypassing of functions, data are transmitted both from control device 100 to development tool 101 and also in the reverse direction. In the process, a large quantity of data, to with the measured vehicle parameters and so on, for example, is constantly transmitted from control device 100 to development tool 101, whereas in the reverse direction only the adjustment values and the like entered by the developer must be transmitted. Accordingly, the data transmission rate required for the transmission of data from control device 100 to development tool 101 is significantly higher than that for the reverse direction.

Accordingly, the transmission of data from development tool 101 to control device 100 takes place in predetermined time intervals (of 10 or 100 ms, for example) in each instance, for a relatively short period of time (of 1 ms, for example). In other words, the transmission of adjustment values and of other data transmitted from development tool 101 to control device 100 takes place in a fixed time grid, in one lump. Only at this time is the transmission direction switched to a unidirectional transmission from development tool 101 to control device 100, whereas the rest of the time a unidirectional transmission takes place from control device 100 to development tool 101.

The time slots of the transmission from development tool 101 to control device 100 may be set to a predetermined value (of 10 or 50 ms, for example) or also be designed as temporally variable). In particular, it is thus also possible to switch the direction of transmission to a transmission from development tool 101 to control device 100 if data for such a transmission actually exist.

In the following, a method for transmitting data with control device 100 is described. In addition, FIG. 2 shows a flow chart of this method.

In step S1, a connection between development tool 101 and memory 109 of control device 100 is established during the development phase of control device 100. To this end, communication interface 110A is connected to development tool 101, and communication interface 110A is connected to first communication unit 107 via switching element 105. The switch position of the switching element is thus set to ATX0/ARX0. Further, communication interface 110B is connected to one or several function units.

In step S2, a unidirectional transmission of data from control device 100 to development tool 101 takes place via the ASC bus protocol (first communication protocol). In the process, measured values are transmitted from memory 109 to development tool 101, for example. This data transmission has a duration of 490 ms in this example, after which the procedure jumps to step S3 (triggered by an internal timer, for example).

In step S3, the direction of the data transmission is reversed, so that now adjustment values are transmitted from development tool 101 to memory 109, for example. In the process, adjustment values are transmitted from development tool 101 to memory 109, for example. In this example, this data transmission has a duration of 10 ms, after which the procedure jumps to step S4.

At the same time as data transmission in steps S2 and S3, signals are transmitted from function units 112 (or emulators simulating them) to second communication unit (CAN controller) 108 via the CAN bus and CAN interface 110B and stored as vehicle parameters in memory 109, for example, and signals (e.g., control signals) are also sent from control device 100 to function units 112. Thus, a bidirectional transmission of data from control device 100 to function units 112 takes place. These function parameters may be transmitted to development tool 101 as measured values in step S2, for example, or also be overwritten in step S3 as adjustment values from development tool 101.

In step S4, a check is done to see whether an interruption condition is fulfilled, which may be the case if the developer orders the interruption or the end of the development procedure, for example. If the interruption condition is not fulfilled, the procedure jumps back to step S2, and if it is fulfilled, the procedure jumps to step S5.

In step S5, the connection between control device 100 and development tool 101 is broken and switching element 105 is switched over to switch position ATX1/ARX1. Thus, first communication interface 110A is connected to second communication unit 108 (CAN controller), so that first communication interface 110A may now be used to transmit data using the second bus protocol (CAN bus protocol). Thus, first communication interface 110A is now available for use as an additional CAN interface in the composite control device system.

In step S6 (that is, after the development phase is completed) additional function units may be connected to communication interface 110A of control device 100 in the composite control device system, and a transmission of data between control device 100 and these function units may take place using the second communication protocol (CAN bus protocol).

The essential advantage of this method is that a large bandwidth is available for the transmission of data during the development phase, while after the development phase is completed the interface used for the transmission of data remains available as an interface in the composite control device system.

Although the exemplary embodiments and/or exemplary methods of the present invention was described above on the basis of the exemplary embodiments, it is not limited to these, but may be modified in various ways. Thus, in the above-described specific embodiment, memory 109 is part of control unit 103; however, it is also possible to provide memory 109 outside of control unit 103.

Further, in the specific embodiment shown in FIG. 1, only one communication unit 108 is provided, which acts as a controller for both interfaces 110A and 110B. However, it is also possible to provide individual controllers for each of the two interfaces 110A and 110B.

Further, in the specific embodiment shown in FIG. 1, function units 112A, 112B, etc. are connected to control device 100 via a communication bus that is designed as a CAN bus. However, it is also possible to connect the individual function units 112A, 112B, etc. to control device 100 directly, that is, respectively via an independent, separately provided interface.

What is claimed is:

1. A control unit, comprising:
    a first communication interface, which is optionally connectable to a development tool or to one or more functional units;
    a second communication interface, which is connectable to the one or more functional units;
    a memory for storing data;
    a first communication unit via which data are transmitted between the memory and the first communication interface using a first communication protocol;
    a second communication unit via which data are transmitted between the memory and the first communication interface using a second communication protocol; and
    a switching arrangement, which optionally connects the first communication interface to one of the first communication unit and the second communication unit;
    wherein the switching arrangement is configured to connect the first communication interface optionally to one of the first communication unit and the second communication unit, and wherein the second communication interface remains permanently connected to the second communication unit.

2. The control unit of claim 1, wherein the first communication protocol is a unidirectional communication protocol.

3. The control unit of claim 1, wherein the first communication protocol is an asynchronous serial interface protocol.

4. The control unit of claim 1, wherein the second communication protocol is a bidirectional communication protocol.

5. The control unit of claim 1, wherein the second communication protocol is a CAN bus protocol.

6. The control unit of claim 1, wherein the control unit is an engine control unit for a motor vehicle.

7. A method for providing data transmission from and to a control unit, which has a first communication interface and a second communication interface, the method comprising:
    connecting the first communication interface to a development tool, and connecting the second communication interface to one or more first functional units during a development phase of the control unit;
    transmitting data from the control unit via the first communication interface to the development tool using a first communication protocol;
    transmitting data from the development tool via the first communication interface to the control unit using the first communication protocol;
    transmitting data between the control unit and the one or more of the first functional units via the second communication interface using a second communication protocol;
    breaking the connection between the first communication interface and the development tool after a termination of the development phase;

connecting the first communication interface to one or more second functional units;

transmitting data between the control unit and the one or more second functional units via the first communication interface using one of the first communication protocol and the second communication protocol; and transmitting data between the control unit and the one or more of the first functional units via the second communication interface using the second communication protocol.

8. The method of claim 7, wherein the transmitting of the data from the control unit to the development tool and from the development tool to the control unit are each carried out as a unidirectional transmission.

9. The method of claim 8, wherein switching over takes place at predetermined time intervals between the data transmission from the control unit to the development tool and between the data transmission from the development tool to the control unit.

10. The method of claim 7, further comprising:

switching over, using a switching arrangement, which optionally connects the first communication interface to one of a first communication unit and a second communication unit, wherein the first communication unit controls the data transmission while using the first communication protocol, and wherein the second communication unit controls the data transmission while using the second communication protocol.

11. The method of claim 7, wherein the first communication protocol is a unidirectional communication protocol.

12. The method of claim 7, wherein the first communication protocol is an asynchronous serial interface protocol.

13. The method of claim 7, wherein the second communication protocol is a bidirectional communication protocol.

14. The method of claim 7, wherein the second communication protocol is a CAN bus protocol.

15. The method of claim 7, wherein the transmitting of data from the development tool to the control unit includes the storing of the data in a memory in the control unit.

16. The method of claim 7, wherein the transmitting of data between the development tool and the control unit includes at least one of the measuring, adjusting, debugging and bypassing of functions during the development phase of the control unit.

17. The method of claim 7, wherein the control unit is an engine control unit for a motor vehicle.

* * * * *